US008655751B2

(12) United States Patent
Renz

(10) Patent No.: US 8,655,751 B2
(45) Date of Patent: Feb. 18, 2014

(54) SYSTEM AND METHOD FOR CONTROL OF COMMODITIES INVENTORY FOR ANIMAL FEED RATIONS

(75) Inventor: Steve Renz, Lakin, KS (US)

(73) Assignee: Animal Health International, Inc., Greeley, CO (US)

( * ) Notice: Subject to any disclaimer, the term of this patent is extended or adjusted under 35 U.S.C. 154(b) by 0 days.

(21) Appl. No.: 13/546,920

(22) Filed: Jul. 11, 2012

(65) Prior Publication Data

US 2014/0019312 A1     Jan. 16, 2014

(51) Int. Cl.
*G06Q 10/00*     (2012.01)
*A01K 1/10*     (2006.01)

(52) U.S. Cl.
USPC ........... 705/28; 705/1.1; 705/7.12; 119/51.01

(58) Field of Classification Search
None
See application file for complete search history.

(56) References Cited

U.S. PATENT DOCUMENTS

| 5,105,767 | A | * | 4/1992 | Gordon et al. | 119/57.92 |
| 5,174,244 | A | * | 12/1992 | Gaalswyk | 119/51.01 |
| 5,487,603 | A | * | 1/1996 | Hoff et al. | 366/141 |
| 5,673,647 | A | | 10/1997 | Pratt | |
| 6,181,982 | B1 | * | 1/2001 | Yuyama et al. | 700/236 |
| 7,240,807 | B2 | * | 7/2007 | Hoff et al. | 222/77 |
| 7,441,515 | B2 | | 10/2008 | Renz et al. | |
| 7,543,549 | B2 | | 6/2009 | Valencia et al. | |
| 7,574,844 | B2 | * | 8/2009 | Kamineni | 53/415 |
| 7,681,527 | B2 | * | 3/2010 | Pratt | 119/174 |
| 7,689,434 | B2 | | 3/2010 | Cureton et al. | |
| 7,744,269 | B2 | * | 6/2010 | Adent et al. | 366/177.1 |
| 7,827,015 | B2 | * | 11/2010 | McGoogan et al. | 703/11 |
| 8,494,892 | B2 | * | 7/2013 | Salomon et al. | 705/7.23 |

* cited by examiner

*Primary Examiner* — Asfand Sheikh
(74) *Attorney, Agent, or Firm* — Sheridan Ross PC

(57) ABSTRACT

A data processing system and method are provided in the form of a livestock management system for specifically managing feeding tasks for a group of animals within a designated location. The system and method incorporate a data processing function wherein comprehensive data is gathered and maintained on individual feed rations which are selectively used to feed a selected group of animals. Functionality of the management system and method include the ability to track amounts of ingredients used for each type of feed ration and any excess or surplus ingredients which may have been withdrawn from storage locations. The management system and method results in improved commodity inventory control to prevent waste of ingredients and to prevent potential cross contamination between different types of feed ration.

18 Claims, 10 Drawing Sheets

SYSTEM AND METHOD FOR CONTROL OF COMMODITIES INVENTORY FOR ANIMAL FEED RATIONS

FIELD OF THE INVENTION

The present invention relates to the management of animals such as cattle during the production life cycle of the animals, and more particularly, to methods and data processing management systems that enable management of feed rations provided to the animals by commodities inventory tracking functions that ensure accuracy of ingredients provided to each feed ration, accountability of each ingredient used to prevent cross contamination between feed rations, and return to inventory of unused ingredients.

BACKGROUND OF THE INVENTION

The cattle industry has undergone tremendous automation in the last few decades. Cattle management systems have been developed that are capable of tracking cattle at various stages within a production cycle. These systems have been developed in response to economic factors in the industry demanding more efficient and cost-effective cattle management. In these systems, data is gathered and processed to allow cattle industry personnel to improve their ultimate return on investment.

One prior example of a cattle management system is the one described in the U.S. Pat. No. 5,673,647. This reference discloses an automation system for individual animal electronic identification, measurement and value based measurement of cattle in a feedlot operation. The invention utilizes a computer system integrated with automatic individual animal identification, multiple measurement and re-measurement systems, and a cattle handling and sorting system. Animals are individually identified and measured by weight, and external dimensions and characteristics of internal body tissue are taken. This information is coupled with animal physiological characteristics and historical data allowing the calculation of an optimum slaughter weight, economic endpoint, and marketing date for shipment to a packing plant. This reference also discloses a method of calculating each animal's share of total feed intake for the animal's feed group. The computer system stores individual animal measurement, performance and location data which is used by feedlot management to select animals for shipment from the feedlot for slaughter at the optimum time. Following an animal shipment to a slaughter facility, the identification in the computer system is used to correlate live animal physical characteristics and performance data to the measured and evaluated carcass characteristics data obtained through the slaughter process. From this information, a database can be developed to more accurately identify and measure value-based characteristics and subsequent animals produced and fed for more effective value based on selection and management of the animals.

Another example of a cattle management system is disclosed in the applicant's prior U.S. Pat. No. 7,543,549. This reference describes a cattle management system and method for managing numerous routine and non-routine management activities. The system and method incorporate a data processing system wherein comprehensive data is gathered and maintained on each individual animal as well as on selected groups of animals. Preferably, a central database is used which allows enhanced functionality with respect to not only data entry and data transfer, but also with respect to providing system generated management recommendations. Some significant functionality of this invention includes the ability to track the location of each individual animal by utilizing unique identification data for each animal, recording all monitored events that take place at each location during the animal's production cycle, and reporting the events and locations as required to government entities, financial institutions, and other entities within the cattle industry.

Another related prior patent of the applicant is U.S. Pat. No. 7,441,515 that also discloses a cattle management system and method for managing numerous routine and non-routine management activities. This reference also more particularly describes managing feeding operations at a feedlot wherein ration changes can be automatically triggered by parameters and rules established for each feedlot, and reporting the events and locations as required to government entities, financial institutions, and other entities within the cattle industry.

As set forth in the two prior patents of applicant noted above, a feedlot operation is just one operation that is included in the overall production and lifecycle of livestock such as cattle. In a broader sense, the livestock industry can be conceptually broken down into two major components, namely, producers and feedlots. Cattle producers include ranch operations that obtain cow herds. The herds produce calves that are raised and typically fed on pasture grazing land. The calves are allowed to reach a certain maturity and the next phase in the cultivation of the cattle is to transfer them to a feedlot where they are fed on grain and other products until they reach an optimal size for slaughter.

Prior to transfer to a feedlot, cattle may also be transported to a grower operation, where cattle undergo intensive management for achieving a period of intensive growth. The feedlot can be considered a final processing phase prior to slaughter, where not only do animals achieve optimum size, but are also closely monitored for diseases and other physical ailments that prevent them from being slaughtered.

As time has progressed, federal and state regulatory requirements continue to impose greater record keeping requirements from both cattle producers and feedlots. For example, for feed that is to be marketed as "hormone free" or "organic", all organizations connected with the care and feeding of the animals must maintain appropriate records to ensure that the beef is in fact of a quality or condition as marketed to consumers. Regulatory requirements have also increased due to certain concerns for disease, and one more recent example includes the "mad cow" disease which has manifested itself in outbreaks, particularly in the U.K.

Therefore, there is a continuing need for a comprehensive data management system where data can be gathered and processed concerning not only economic factors important to determining return on investment, but also for complying with proposed regulations concerning tracking of animal health and all feed and medications provided to the animals during their production cycle.

One of the more critical areas of livestock management is feed management. More particularly, many new general safety and regulatory requirements dictate that animal feed rations are recorded in detail to include any medications or drugs that an animal may receive. From a production standpoint, feed rations have become increasingly complex, and some of the ingredients used in common feed ration recipes constitute a considerable expense in the overall cost of livestock production. Thus, monitoring and minimizing ingredient waste in delivering feed rations to the animals is another important aspect of feed management.

Therefore, there is generally a need in the industry for comprehensive and strict commodity control of each ingredient or commodity that may be used in a particular feed ration.

SUMMARY OF THE INVENTION

According to the present invention, a data processing system and method is provided that allows for control of commodities inventory for animal feed rations. More specifically, the present invention includes a data processing system and method that allows for control of ingredients used to make up a feed ration to track exact amounts of ingredients used, to include any surplus or overage amounts of ingredients that are withdrawn from storage and loaded or transported for delivery to a feed ration but not used within the feed ration. Any surplus or otherwise unaccounted for ingredients must be returned to their original storage location. This tracking of surplus withdrawn ingredients ensures that subsequent feed rations are not cross-contaminated with the wrong ingredients, and also provides for improved inventory control of the ingredients not ultimately delivered to fulfill a feed ration order.

In one aspect of the invention, a data processing system and method is provided for control of the loading operation for feed rations in which multiple ingredients are retrieved from separate storage locations, and are then combined at a central location, such as at a feed mixer or transport loading area, for subsequent transport to designated locations within a facility such as a feedlot. Each feed ration will typically include a specific recipe that requires different ingredients to be picked up and transported from the various storage locations to the feed mixer/transport loading area (hereinafter collectively referred to as the transport loading area).

In theory, a load operator should pick up the exact ingredient amounts from storage for a particular called-for recipe. However, in practice, a load operator will typically pick up an amount that is greater than the amount actually required for the recipe. Particularly for bulk ingredients that make up the greatest percentage of the feed ration, picking up of this material is done manually by a vehicle such as a bucket loader. The vehicle operator will withdraw an amount of an ingredient, at least as much as the recipe requires or more, since it is undesirable to make multiple vehicle trips when delivering them to the transport loading area. Multiple vehicle trips for a single ingredient require multiple weighing steps, and significantly complicate recordation of ingredient delivery. Therefore, surplus or overage in withdrawal of ingredients presents a problem in that ingredients left in the bucket of the vehicle can inadvertently be used in another different feed ration thereby contaminating the next load, or at least wasting the ingredients in the next load.

One significant drawback with existing feed management systems is that there is no method of control for confirming that excess ingredients not used within a feed ration are returned to their storage locations. For example, it is well known that a vehicle operator may withdraw a particular called-for amount of an ingredient, and the actual amount that the operator then delivers to the feed ration is weighed when the operator discharges or dumps the ingredient at the specified location. However, there is no tracking or recording of when and how much of the overage or surpluses is then returned to its storage location or how much remains in the vehicle. Although an operator may realize that the surplus overage should be returned, if the operator believes the amount of surplus is relatively small, or if the operator is not aware of the surplus, the remaining amount of the ingredient in the vehicle may be carried to the next storage location where the operator then withdraws an amount of a different ingredient. Thus, ingredients can become inadvertently mixed, ultimately changing the makeup of the batch or load which is being developed for the feed ration. Therefore, while it is well known to provide scales to measure the amount loaded upon the vehicle and the amount of material that may be ultimately delivered to a truck loading area, there is no adequate control for tracking amounts of ingredients withdrawn from an original storage location. Balancing the excess amounts of material that have been withdrawn but not actually added to a feed ration is an important unresolved issue in livestock feed ration management.

Therefore, according to one aspect of the invention, a data processing system and method is provided in which the excess or surplus materials left in a vehicle are tracked, requiring the operator to return the materials to the correct storage location(s) prior to loading and transporting the next ingredient of the called-for feed ration.

In another aspect of the invention, a data processing system includes a comprehensive group of operator interfaces that enables a vehicle operator to precisely control amounts of ingredients which are to be loaded and delivered according to recipes that require specified amounts of different ingredients. These operator interfaces also include the display of error messages or warnings to the vehicle operator in the event there is withdrawal of ingredients in excess of what is required for the called-for ration. The messages then instruct the operator on what should be done to rectify the problem by providing detailed information on what ingredient should be returned to a specific storage location. The data processing system incorporates the use of a GPS coordinate tracking capability in which each of the storage locations of the ingredients to be used have a pre-designated GPS coordinate. When an operator takes an amount of an ingredient from a storage location, this information is recorded in the data processing system enabling the system to advise the operator as to when, where and what ingredient have been withdrawn. The system prevents the operator from continuing with the preparation of the feed ration until all ingredients are accounted for to include any excess amounts that have not been returned to their original locations prior to the operator withdrawing the next ingredient in the recipe for the feed ration.

In accordance with a method of the invention, a recipe for a called feed ration is determined that comprises a number of ingredients, such as bulk macro-ingredients, micro-ingredients, and others. The micro-ingredients may be prepared as a single mixture of constituent materials, and may be stored at a single location. Micro-ingredients may include various vitamin supplements, medications, and other pharmaceuticals. The bulk macro-ingredients may include bulk feed such as corn, oats, and other grains. Once a particular ration is selected, comprising the corresponding ingredients, an operator may then activate a load sequence in which the operator's vehicle is instructed by an operator interface to withdraw selected amounts of ingredients at designated storage locations. The operator will then sequentially load each of the ingredients and take them to the designated transport loading area for mixing and/or transport to the designated locations within the feedlot facility. For each ingredient withdrawn, the system may provide scales at each ingredient storage location and at the transport loading area to track the amounts of the ingredient that have been withdrawn from the storage location versus the amounts delivered to the transport loading area. As mentioned, in many circumstances, the vehicle operator may withdraw an excess or overage of a particular ingredient to prevent having to make multiple round trip loads for a single ingredient. The data processing system may generate an automatic comparison of ingredient amounts delivered to the transport loading area verses the amounts withdrawn from the storage location to account for excess amounts of materials that should be returned to the storage location. In a preferred embodiment, the operator interface could display an error or alarm message to the vehicle operator triggered by a discrepancy noted between withdrawn and delivered amounts of ingredients. Accordingly, the operator then must return any excess or surplus amount of each ingredient to its storage location prior to obtaining the next ingredient specified in the recipe for the called-for ration. By recording the weight of the ingredients delivered to the transport loading area as well as amounts of the ingredients withdrawn from the designated storage locations, this method prevents errors in the recipes which inevitably occur if there is any amount of ingredients remaining in the vehicle after the ingredients are delivered to the mixing/transportation location. Further, in order to assist the operator as to what ingredients should be returned to storage and to where, the operator interfaces provide a load history for each ingredient that assists the operator in recollecting what excess ingredients need to be returned to storage, and where they should be returned to.

Additional advantages and features of the invention will become apparent from a review of the following figures taken with the accompanying detailed description.

DETAILED DESCRIPTION

A system overview is provided in FIGS. 1-4 discussed below. These figures also appear in the Applicant's prior U.S. Pat. No. 7,543,549. Applicant hereby incorporates by reference this prior patent for purposes of disclosing a general data processing system and basic functionality associated with the same as it applies to the loading and ingredient management of the present invention.

Figure 1:
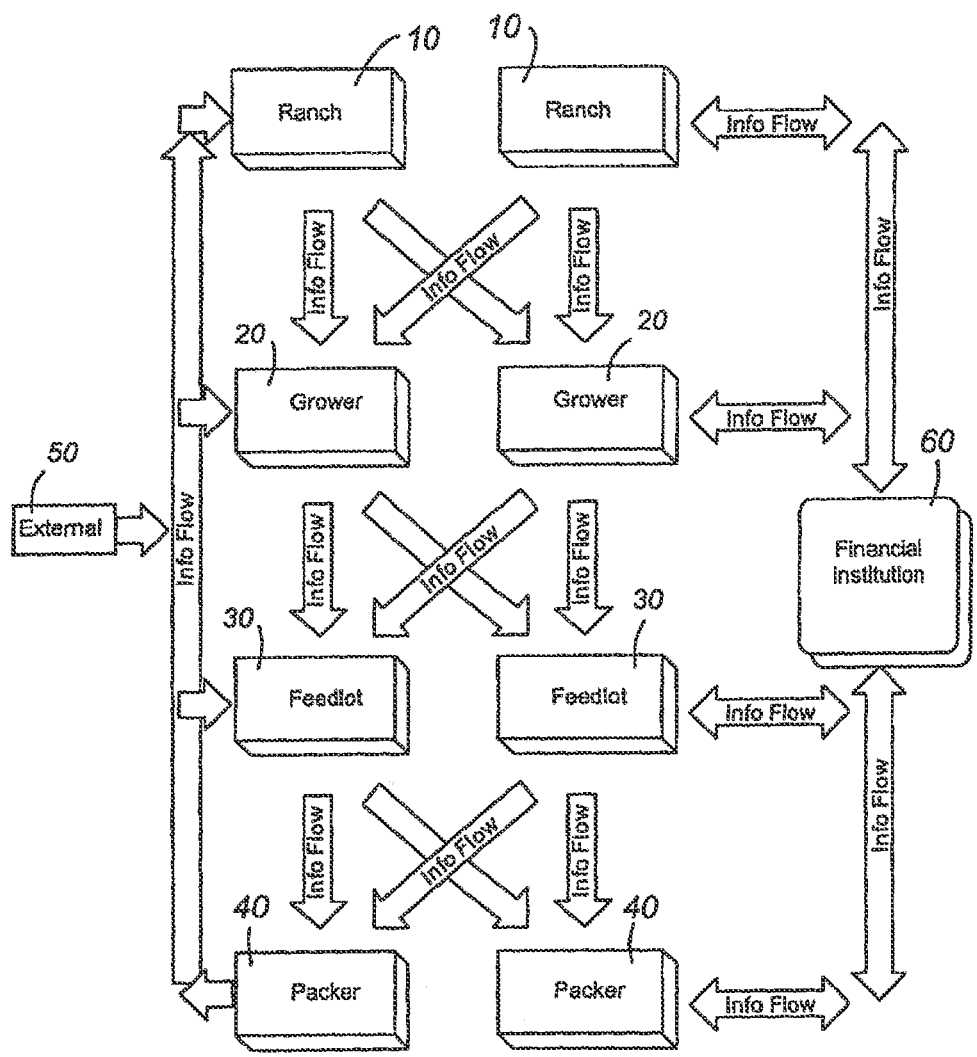
FIG. 1 is a flow diagram illustrating flow of information/data within a data processing system of the present invention.

First referring to FIG. 1, an information flow diagram is provided showing the basic flow of information/data within the data processing system and the organizations that generate, transfer and receive information. Beginning with a ranch or cow/calf operation 10, information is generated and may be transferred to one or more intermediate grower operations 20. The growers generate and transfer information to the feedlots 30. The feedlots 30 generate and transmit information to the packers 40. Information may also be generated and transferred from external sources 50 and integrated within the information that is created, stored, and transferred in each level between the ranch operation and the packers. For example, the external source 50 could generate information regarding new animals brought into a particular herd from a third party source. As also shown in FIG. 1, information transferred between ranchers, growers, feedlots and packers does not necessarily travel between exclusive associations or relationships; rather, ranchers will periodically transact business with various growers, growers will transact business with various feedlots, and feedlots will transact business with various packers. As also shown in FIG. 1, a corporate entity 60 is shown which may have an interest in receiving and transmitting data to the various organizations. A corporate entity could include those which track performances of feedlots or ranches, or the corporate entity could be a financial institution that calculates return on investment for a particular feedlot, grower or packer.

Figure 2:
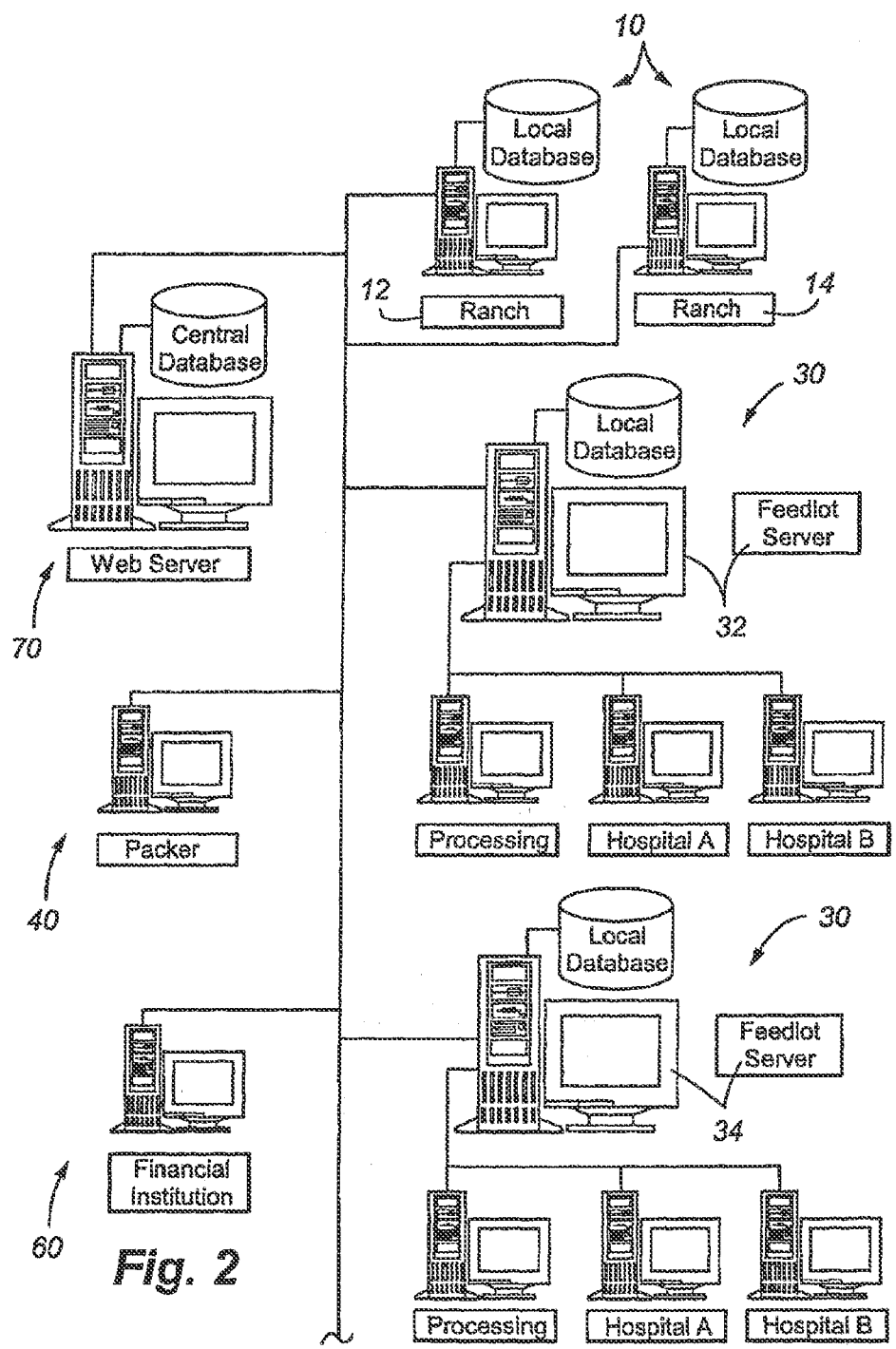
FIG. 2 is a simplified schematic diagram illustrating an example of implementation of the data processing system of the present invention within various organizations.

FIG. 2 is a simplified schematic diagram illustrating one example of how the data processing system of the present invention may be incorporated within various organizations of the system. Two ranch operations 10 are illustrated, namely, ranch 12 and ranch 14. Each of the ranches would have a sufficiently powerful computer and local databases for running of the cow/calf module. As discussed further below, the cow/calf module is specifically designed to collect all data associated with breeding, birth and processing operations at a ranch location. The cow/calf module can be considered a stand-alone herd management tool, and the cow/calf module can be interfaced with the grower/feedlot module. Two feedlot operations 30 are illustrated, namely, feedlot 32 and feedlot 34. Each of the feedlots may include their own server and local database(s) for storage of data generated in the grower/feedlot module. Within the feedlots, various other computers may be found which input data directly into the database(s) at the local servers. For example, each of the feedlots 32 and 34 are shown as including discrete work stations within the feedlot which directly input information to the local database. These workstations include a processing station, hospital A and hospital B. These stations would not have their own databases, but rather would directly update the local database found at the local server. FIG. 2 also illustrates other organizations within the system to include a packer 40 and a financial institution 60. These organizations are also shown without databases since they would simply request data from the local servers at the feedlots, or transfer data to the local servers.

FIG. 2 also illustrates the use of a web server 70 which includes its own central database. It may also be desirable to have a web server with a central database which would ultimately serve as the single repository for storage of data within the system. Thus, if a web server was used, the local servers at the feedlots could temporarily store data until it was transferred to the central database. Accordingly, each of the organizations within the system would then access data from the central database as opposed to accessing data at each of the separate local servers. In some circumstances, incorporating a central database at a web server may better facilitate the ability to more efficiently store and update system information, as well as enhance the ability to transfer data to multiple organizations.

Referring again to FIG. 2, in lieu of the web server 70 being a central repository for storage of data, the web server 70 could simply act as a secure Internet FTP server which would provide a secure means of data transfer between organizations in the system, and transferred data is only resident on the server 70 while being transferred between the systems and then removed when the data transfer is complete. Thus, the web server 70 could simply be an Internet FTP site.

Figure 3:
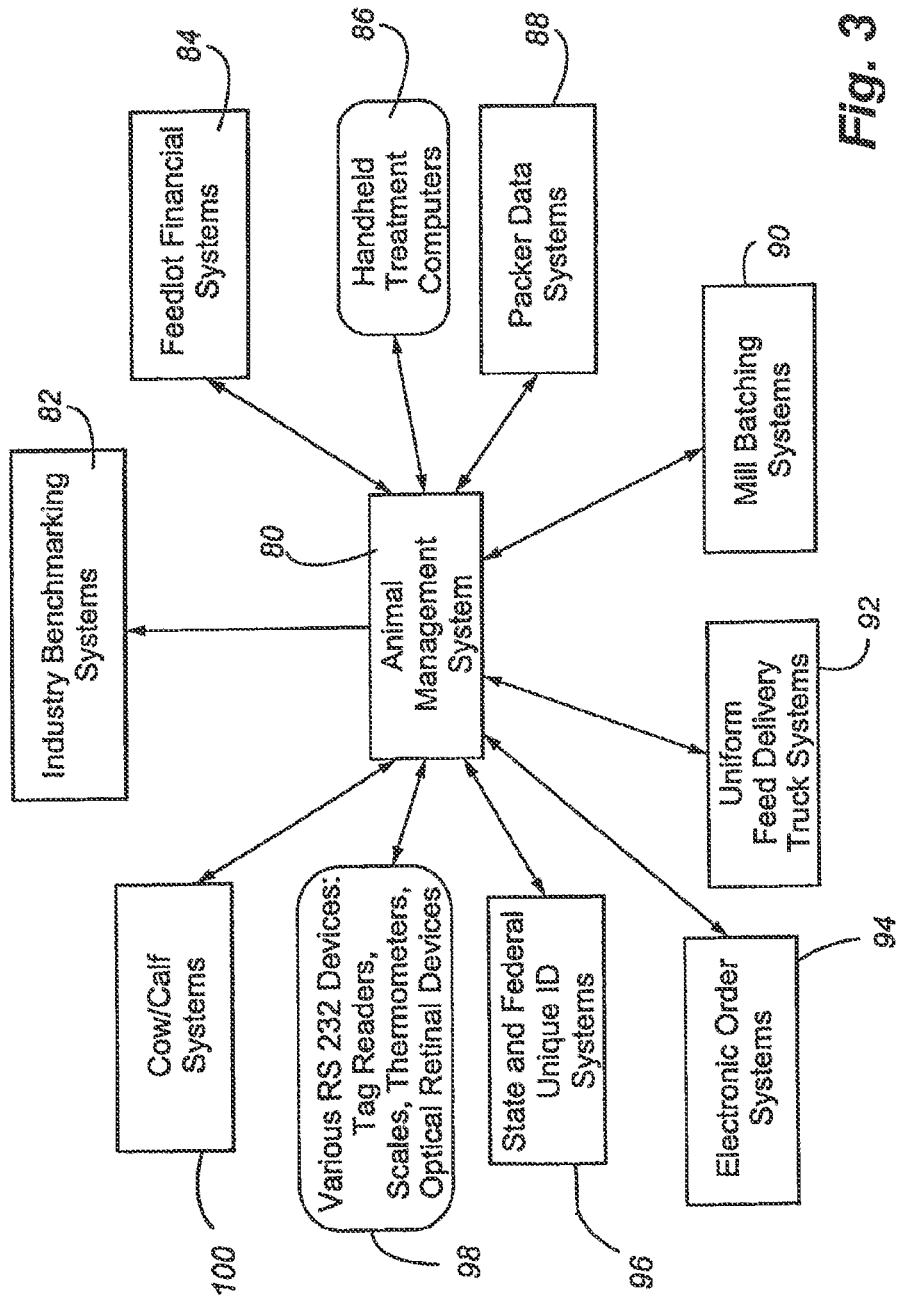
FIG. 3 is another schematic diagram illustrating external information systems that may interface with the data processing system of the present invention.

Another important aspect of the present invention is its ability to interface with various other information systems and data acquisition equipment for data entry into the system. Referring now to FIG. 3, a schematic diagram is provided to illustrate some example external information systems that may interface with the data processing system of the present invention.

System 80 of the present invention is described as an animal management system which interfaces with a great number of external information systems to include industry benchmarking systems 82, feedlot financial systems 84, hand held treatment devices 86, packer data systems 88, mill batching systems 90, uniform feed delivery truck systems 92, electronic ordering systems 94, state and federal unique ID systems 96, various RS 232 devices 98, and cow/calf systems 100. The methods of data transfer between the animal management system 80 and the outside systems can be recording media (such as CD's, diskettes, etc.), Internet FTP, Intranet, and various network configurations such as wide area and local networks as further discussed below.

Cow/calf systems 100 refer to third party cow/calf systems specifically designed for animal management at a ranch location. Typically, cow/calf systems 100 are stand alone computer systems that are installed and run at each separate ranch location. These systems record all sire and dam data along with recording all calves born at the ranch location. These systems also record all treatment of calves while at the ranch location. These systems also may be designed to analyze herd data and assist ranch management in detailed herd management functions. The herd management function may be designed to receive data associated with feeding, treatment and packer production from other systems and supply reporting that will assist ranch management in fine-tuning its breeding programs for better return on investment. Typical interface methods for a cow/calf system may include recording media or transfer by Internet FTP. With all interfaces incorporated within the present invention, the preferred method of transfer is a secure Internet FTP server. For most cow/calf systems, the secondary method of transfer would likely be recording media such as optical disks, magnetic disks, or other similar mass storage devices. In terms of a data format during transfer, one convenient protocol would be for storage of the data in a flat ASCII file format. The data can then be reconfigured within the feedlot servers or web server as desired based upon the type of resident databases which may be found in each location.

A uniform feed delivery truck system 92 includes those truck based computer systems that control the uniform delivery of feed to a feed bunk. These systems control the amount and rate the feed is dispensed from the feed truck based upon a previous call from each feed bunk. The animal management system of the present invention can send data to the delivery truck system to include information such as ration codes, ration call amounts, bunk locations, and other bunk specifications which dictate the delivery of feed to the feed bunks. The feed truck systems in turn record the actual amounts of ration delivered to the feed bunk to include truck identification and driver identification. The preferred method of data transfer between the system of the present invention and the feed delivery truck systems would be through a radio frequency connection that utilized a network or radio modem. Secondary methods of data transfer could be use of any type of recording media.

A hand held treatment device 86 is a remote device that is designed to record certain transactions associated with the animal health module of the present invention without a direct connection to the database of the system while recording the transaction. These types of hand held computers record individual animal treatments, processing and individual animal receipt transactions. Data validation tables along with active animal identification data are downloaded to these hand held computers prior to use, and then recorded transactions will be uploaded to the database of the present invention and posted to the database. The preferred method of data transfer between the invention and the hand held computer would be through a network protocol utilizing a radio frequency connection, a Blue Tooth protocol or a cable connection. The cable connection could be a number of known connections such as RS232/USB connections. A secondary method of transfer could include use of recording media.

Mill batching systems 90 are computer systems that control ration mixing equipment located at a feed mill. These systems select ration formulas and batch sizes to be mixed by the mill equipment. The present system can transfer data to the mill batching systems in summary or detailed levels. A summary level would simply transfer a particular ration code and total call amount to the batching system, and the batching system would comply with batching amounts in the size and content as requested. The actual batch content for each ration would be transferred back to the system from the batch control system. At a more detailed level, transfer could be obtained for truck batch identification numbers, batch sizes, pens to deliver and batch ingredient content to the mill batching systems, and the actual batch ingredient amounts along with batch identification would be returned to the system. The preferred method of data transfer between the present system and the batching system would be through network protocol utilizing a radio frequency connection or a cable connection. A secondary method of transfer could be use of any recording media.

Feedlot financial systems 84 refer to the various industry specific financial control computer systems. The data processing of the present invention sends data associated with cattle inventory, animal healthcare data and animal feeding data to these financial control systems. The data processing system then can receive certain selected data elements associated with groups of cattle and individual animals from these financial control systems. The preferred method of data transfer would be through network protocol utilizing a radio frequency connection or a cable connection. Secondary methods of data transfer could be use of any recording media.

Packer data systems 88 refer to packer production data files from packers in the form of files that contain production data identified by the unique animal identification numbers. The present system posts this production data to individual animal records in the databases of the present invention. This production data can in turn be used to analyze individual animals or groups of animals for return on investment, producer evaluation, and buyer evaluation or can be interfaced back to a cow/calf system to assist the ranch manager with herd evaluation or return on investment. The preferred method of data transfer or packer data systems would be through a secure Internet FTP server. A secondary method of transfer could be use of any type of recording media.

State and federal unique ID systems 96 refer to data transfer between the present system and those federal and state entities which may require unique animal identification data and unique premise data. The present invention would have the capability to transfer unique animal ID's along with premise ID's, as well as certain activities associate with each animal to the various state and federal agencies requesting information on individual animals and individual locations. The preferred method of data transfer between the present invention and the various state and federal agencies would be through a secure Internet FTP server. The secondary method of transfer could be any recording media.

For industry benchmarking systems 82, the present invention has the capability to send individual animal data that contains treatment, feeding and production data to the various industry benchmarking systems. Industry benchmarking systems 92 refer to those which analyze data from feedlots to determine basic productivity/profitability of organizations within the industry. The preferred method of data transfer between the benchmarking systems and the present invention would be through a secure Internet FTP server. A secondary method of transfer could be any type of recording media.

The electronic order systems 94 refer to those outside ordering systems which allow automatic generation of supply orders to fulfill the supply needs of a particular location such as a ranch or feedlot. The present invention would automatically transfer data to the electronic ordering systems based upon current inventory, projected usage, preset order levels, reorder points, and any other criteria set for required stock of any supplies. The preferred method of data transfer would be through a secure Internet FTP server. The secondary method of transfer could be faxing of generated order documents to a particular order processing group that handles customer orders.

The various RS232 devices 98 refer to field devices such as scales, tag readers, temperature measuring devices, and retinal scanning devices. These devices can be connected to the present data processing system via cables, radio frequency connections, or other connections. The data being recorded by these devices can be passed from a particular terminal location or work station directly into the database(s) of the present invention.

Figure 4:
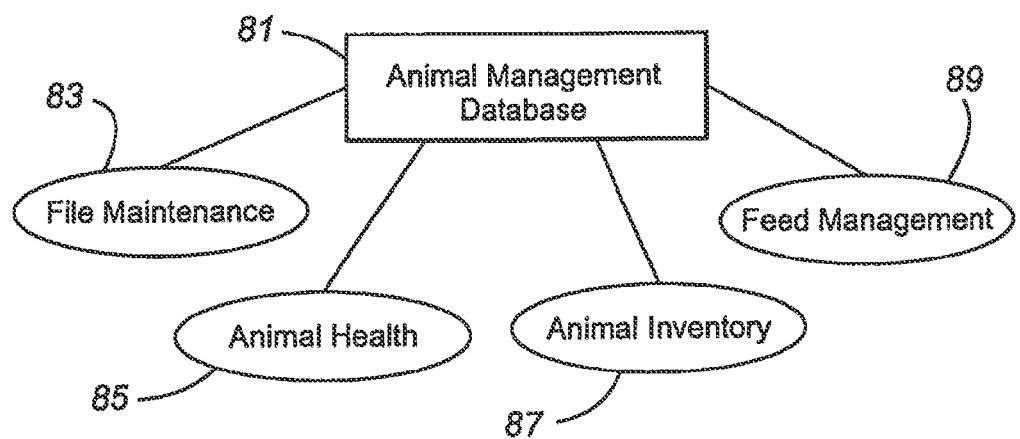
FIG. 4 is another schematic diagram illustrating a central database, and various functional modules that communicate with the central database for data storage, retrieval, transfer and other functions of the modules.

FIG. 4 illustrates another schematic diagram illustrating one example of how a central database is incorporated within the present invention. As mentioned above, with respect to the web server 70, this central database may reside at the web server, or any of the other local servers of the system that transfer data to and from the various other servers. More specifically, this central database can be incorporated within any one or all of the modules allowing a operator to provide data inputs that are then accessible for all functions of the system. In the example, the single or central database is represented as animal management database 81 for the grower feedlot module. Four primary functions of the grower feedlot module are illustrated as being associated with the animal management database, namely, file maintenance 83, animal health 85, animal inventory 87, and feed management 89. All data relating to these four primary functions are stored within the animal management database 81. By use of the single central database, multiple data entries for the same event or data entry is eliminated, and a single data entry can potentially affect any number of module functions assuming the module functions require the data in one or more data fields of the function. For example, when an individual animal is treated in the animal health module and is moved to a hospital pen, a data entry is made which records the animal as being moved to the hospital pen. This data entry can be created in any number of different manners to include an RFID transponder that interrogates the animal's tag and then the transponder communicates with the system for data input of the tag ID. A feed management module feed calculation for the animal's home pen is then affected by the removal of the animal to the hospital pen. That is, the feed calculation is reduced an appropriate amount to account for the absence of the animal at the home pen. The feed calculation function incorporates an algorithm or mathematical expression that requires a daily head count, and the daily head count is determined by analysis of data entries corresponding to the pen locations of the animals. The feed management module feed calculation for the hospital pen is also affected to account for transfer of the animal to the hospital pen, wherein the feed call is increased an appropriate amount to account for the animal arriving at the hospital pen. Accordingly, all cattle activity movements to include full pen or partial pen movements by a single data entry recording the move results in the automatic adjustment of the feed call functions for both the gaining and losing pens.

With respect to the animal management database illustrated in the FIG. 4, the software associated with the commodities control of the present invention can be incorporated as an additional software module, and may be made part of the feed management module 89. Alternatively, the software associated with the commodities control of the present invention could be a separate module, but still capable of being interfaced with the other functional modules to therefore provide a more robust livestock management solution.

In order to better understand the present data processing system, a number of operator interface displays or screens are provided to show the functionality of the system as it applies to the various tasks which create data entries, transfer data and manipulate data, and which therefore result in the ability to track, monitor, and report on feed management activities. These displays would typically be provided on an operator screen of a computer monitor. The terms "operator screen" or "operator interface screen" shall be understood to encompass any visual display of data and system information provided to the operator. A conventional operator ID and password convention can be incorporated thereby providing each operator in the system with specified access to various functions of the data processing system. Therefore, the present invention specifically contemplates pre configuration of the overall data processing system wherein operators at a particular premise location may only have limited access to data generated from other locations.

Figure 5:
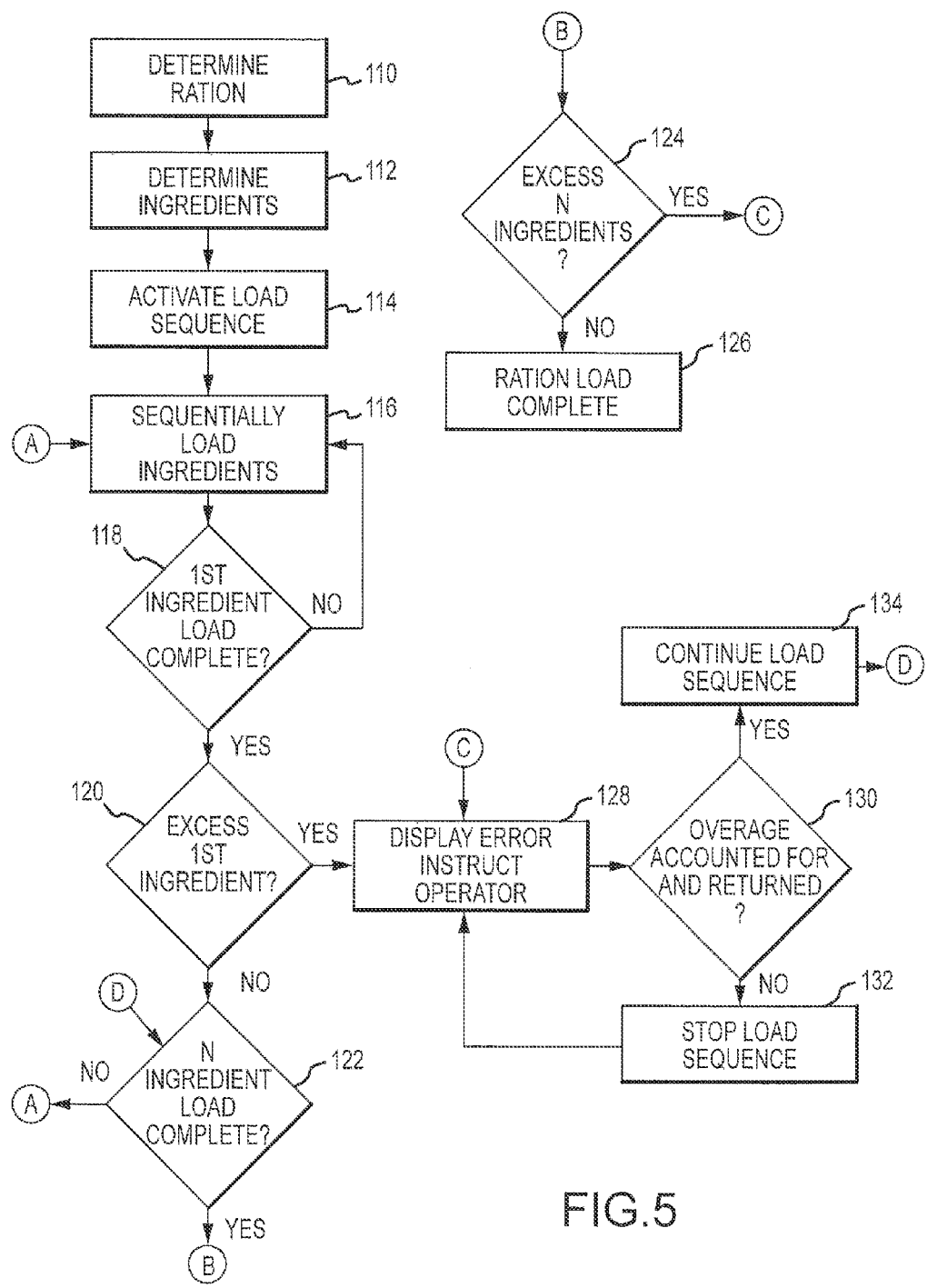
FIG. 5 is a flow diagram illustrating a method of the present invention which enables a system operator to accurately track commodities used in a feed ration to include any surplus or excess amounts of ingredients that are not delivered to the feed ration.

Referring to FIG. 5, a method of the present invention is illustrated in the form of a simplified flow diagram which sets forth the significant actions that take place enabling control of the commodities used in the feed rations, and more particularly to prevent loss of accountability for ingredients that are picked up by an operator but not delivered to a designated location such as a transport loading area in a feedlot.

Referring first to block 110, a ration is determined for feeding to a group of animals according to a ration schedule or some other requirement generated by the feed yard or other location where the animals are located. Referring to block 112, consistent with the ordered ration, the ingredients for each ration are determined. In most cases, a recipe is generated for each ration which predetermines the ingredients to be delivered for each ration. Referring to block 114, the automated generation of each of the ingredients and amounts to be delivered according to a ration enable the operator to activate a load sequence in which a vehicle operator can be instructed, for example by a operator interface screen, to pick up and load designated types and amounts of ingredients for delivery to a designated location such as the transport loading area. Typically, a feed ration for a group of animals involves a number of loads that must be delivered by the vehicle operator to the transport loading area, and these loads then collectively fulfill the called-for feed ration. The loading process is a time and vehicle/manpower intensive operation. Therefore, an operator strives for delivery of the ingredients in a minimum amount of time with the minimum loads.

Referring to block 116, the vehicle operator sequentially loads the ingredients according to instructions provided by the operator interface. At block 118, the vehicle operator indicates the loading of each ingredient by generating an input in the form of a key stroke/mouse click that communicates with the data processing system to signify that the pick-up of the ingredient and the loading of the ingredient are complete. Referring to block 120, after the operator indicates that loading of the particular ingredient is complete, the system will check to determine whether the operator has picked up a greater amount of a particular ingredient than is required for the feed ration according to the predetermined recipe for the ration. For example, the vehicle operator may have picked up 300 lbs of a bulk grain material, only 280 lbs of which were required for the designated feed ration. The operator will dump the required 280 lbs of grain material thereby leaving 20 lbs of material in the bucket of the vehicle. While a scale at the transport loading area may indicate that the requisite amount of material has been delivered, that particular scale cannot account for the excess 20 lbs of material that still remains in the bucket of the vehicle. Accordingly, another scale located at the storage location from which the ingredient was picked up would note the discrepancy, that is, 280 lbs delivered vs. 300 lbs which were initially picked up from the storage location.

Prior to the operator picking up the next ingredient for the feed ration, the system would generate a signal to the operator, such as an error message on an operator interface screen, indicating that the vehicle operator must return the excess 20 lbs of material to its appropriate storage location. Referring to the flow diagram of FIG. 5, if there is an excess amount of the first ingredient that has not been accounted for, at block 128 a message is displayed to instruct the operator to take action. The operator interface would include at least an indication of the ingredient that needed to be returned and the specific location where the material needed to be returned to. Referring to block 130, if the overage/surplus is now accounted for and returned to its storage location as shown in block 134, the load sequence can be continued to complete the loading of the called-for feed ration. If there is still a discrepancy and the surplus/overage is not yet accounted for and returned, the load sequence is stopped, as shown at block 132. This stoppage prevents the vehicle operator from obtaining information on the next ingredient to be loaded, or otherwise provides some warning to the operator to cease loading operations until the discrepancy is rectified. Although the vehicle operator could potentially ignore the error message referenced at block 128, if the operator was denied obtaining information on the next ingredient to be loaded, this would make it very difficult if not impossible for the vehicle operator to continue loading the ingredients for the feed ration.

Referring to block 122, the sequential process of loading each ingredient with the operator signifying that loading of the particular ingredients is complete is repeated N number of times until the loading sequence is complete. Referring to block 124, each time an ingredient is loaded, there is also a check by the system to ensure that excess ingredients are accounted for at each loading step until the ration loading is complete, shown at block 126.

Figure 6:
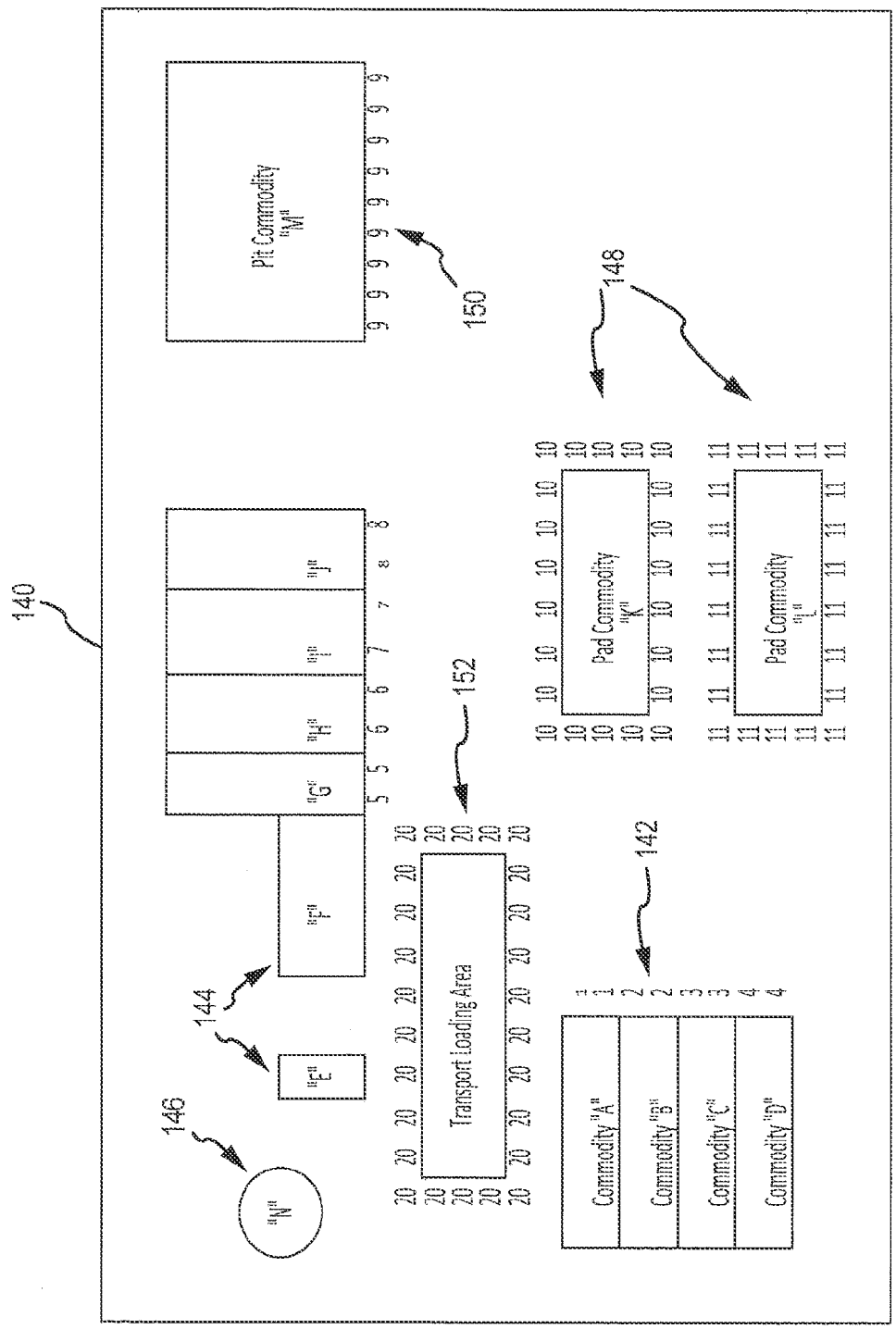
FIG. 6 is a schematic diagram of a location, such as within a feedlot, where commodities/ingredients are stored to include assigned GPS locations that enable the system to accurately record and monitor the withdrawal of commodities/ingredients used in the preparation of feed rations.

Referring to FIG. 6, a schematic diagram is provided for the lay-out of a particular area within, for example, a feed yard in which each of the ingredients or commodities are stored at a particular location, and the ingredients are consecutively transported to a transport loading area where the ingredients are weighed, may be mixed, and then subsequently transported to the desired locations within the feedlot. More specifically, FIG. 6 illustrates a GPS mapping for each of the ingredients/commodities in which each location that holds a commodity has a unique and predetermined GPS location that facilitates tracking of the inventory at each ingredient storage location. Each of the locations also includes a scale that provides information as to the weight of the ingredients over time. Each time an ingredient is removed or added to a storage location, the weight and identity of the ingredient is recorded enabling the system to track inventory and to provide a basis by which an error message can be displayed for the vehicle operator regarding discrepancies in ingredients withdrawn and delivered.

FIG. 6 more specifically provides an example lay-out for commodity/ingredient storage in which commodities/ingredients "A-D" correspond to a first general type of commodity 142 or category, commodities/ingredients "E-J" correspond to another type of commodity/category 144, commodity/ingredient "N" corresponds to a liquid commodity 146, commodities/ingredients "K" and "L" correspond to larger bulk materials 148, and commodity/ingredient "M" corresponds to yet another type of large bulk material 150 stored in a pit. The transport loading area 152 is designated as the location where the ingredients are delivered to by a vehicle operated by the operator. As shown, each of the commodity locations has designated GPS coordinates which enable each of the locations to be tracked in terms of the vehicle making contact with the commodity locations, the vehicle itself also having a GPS tracking device enabling its movement to be tracked in comparison to the stationary commodity GPS coordinates. Referring to commodity A, for example, the opening to commodity A is designated by the GPS coordinates 1-1. If the opening was approximately 20 feet wide, both sides of the opening would be mapped therefore giving a range of GPS locations which define the opening. The depth of the opening could also be defined giving an overall "envelope" of GPS locations which could be stored and labeled as GPS coordinate location 1-1 corresponding to both the width and depth of the commodity bay A. The other locations could also be defined in the same envelope fashion, for example, referring also to the transport loading area 152, the four corners of the truck loading area can be defined as corresponding to a GPS location 2-0 that defines the width and depth of the loading area. Each of the commodity locations have independent tolerance ranges to ensure that movement of the vehicle and access by the vehicle to the various commodity locations are accurately recorded according to the resolution of the GPS installed. Therefore, through the GPS coordinate system, a historical record in the form of data stored in the system over time can track the movement of each vehicle and the exact times in which the vehicle made contact with the mapped locations. This data coupled with the recorded scale data at each mapped location enables the real time tracking of ingredients, and to generate required messages to the vehicle operators if there are discrepancies in ingredient delivery and return.

Applicant's prior U.S. Pat. No. 7,689,434 entitled "Satellite Based Global Positioning System for Feedlot Computer Network and Method" is hereby incorporated by reference for purposes of generally disclosing the basic methodology and equipment that may be used for incorporating a global positioning system in a location such as a feedlot, in which it is desired to track both stationary locations such as feed pens, as well as mobile objects such as vehicles. In the present invention, the same general GPS system may be incorporated in which the commodity locations are mapped similar to the pen locations in the '434 patent.

Figure 7:
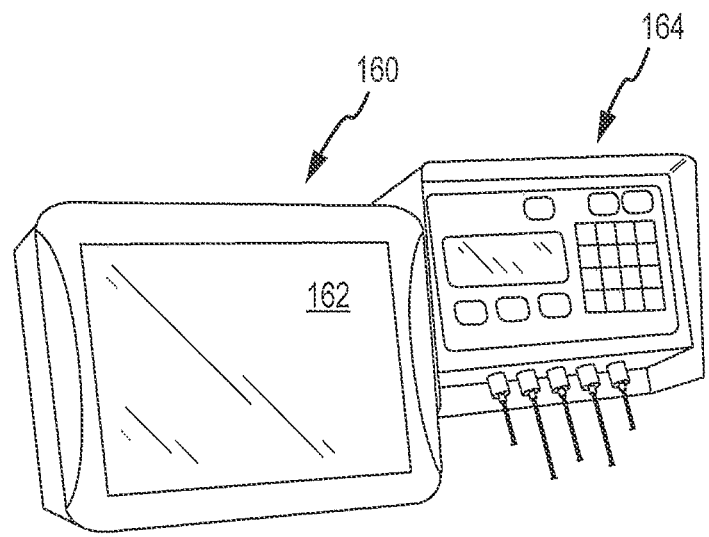
FIG. 7 is an example operator interface screen, scale indicator and operator input device that enables a vehicle operator to execute a loading sequence for delivery of ingredients to fulfill a called-for feed ration.

Referring now to FIG. 7, a visual display 160 is shown that can be used to allow the operator to communicate with the data processing system in which the display may generate many operator interface screens 162. The visual display 160 may be a touch screen display so the operator has the capability for entering information and otherwise communicating with the data processing system. Also shown in FIG. 7 is a scale indicator 164 in which the vehicle operator may view information as to the amounts of ingredients that are loaded onto the vehicle, other scale readings such as amounts of the ingredients remaining in the particular commodity storage locations, and/or amounts loaded into the transport loading area. Therefore, FIG. 7 generally represents one example of hardware associated with a vehicle operator interface to achieve an ongoing interface between the operator and events occurring as monitored by the data processing system.

Figure 8:
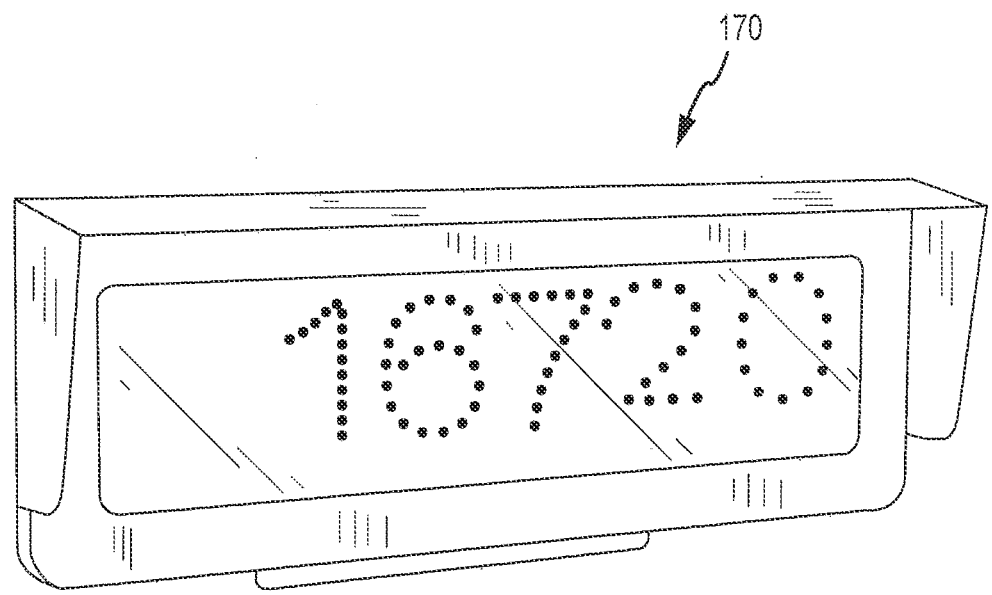
FIG. 8 is an example remote indicator that can display a message or alert screen and which may be installed at various locations within the system to specifically include the designated ingredient locations to advise the vehicle operator of the status of the loading sequence.

FIG. 8 provides an example of a remote indicator 170 which may communicate information to the operator, and such remote indicator 170 could be located outside of the vehicle at each of the commodity locations and the truck loading area providing an indication of information such as the particular commodity to be loaded, the commodity amount to be loaded, the progressive amount of the commodity being downloaded in weight once the loading has started, a load warning which warns the loader operator when the expected amount reaches a "close to" finished amount, and a warning or error message to the loader operator indicating problem with the loading sequence such as an excess amount that has been transferred to the loading area beyond what is required in the feed ration recipe.

With respect to the visual display 160, it shall be appreciated that this device would normally communicate with the feedlot computer system in which the particular feed rations to be loaded and delivered are determined by the feedlot operations and therefore the particular software providing the functionality for generating the user interface could be installed at the feedlot server, among other locations. Alternatively, the software associated with the operator interface could be a web-based solution in which a wireless communication link provides the necessary communication between the operator interface and a computer/server which runs the software. Yet further in the alternative, the actual vehicle itself could have its own stand alone computer which runs the software, and information regarding the rations could be wirelessly downloaded from the feedlot server, or from a web-based solution to the stand alone computer.

Figure 9:
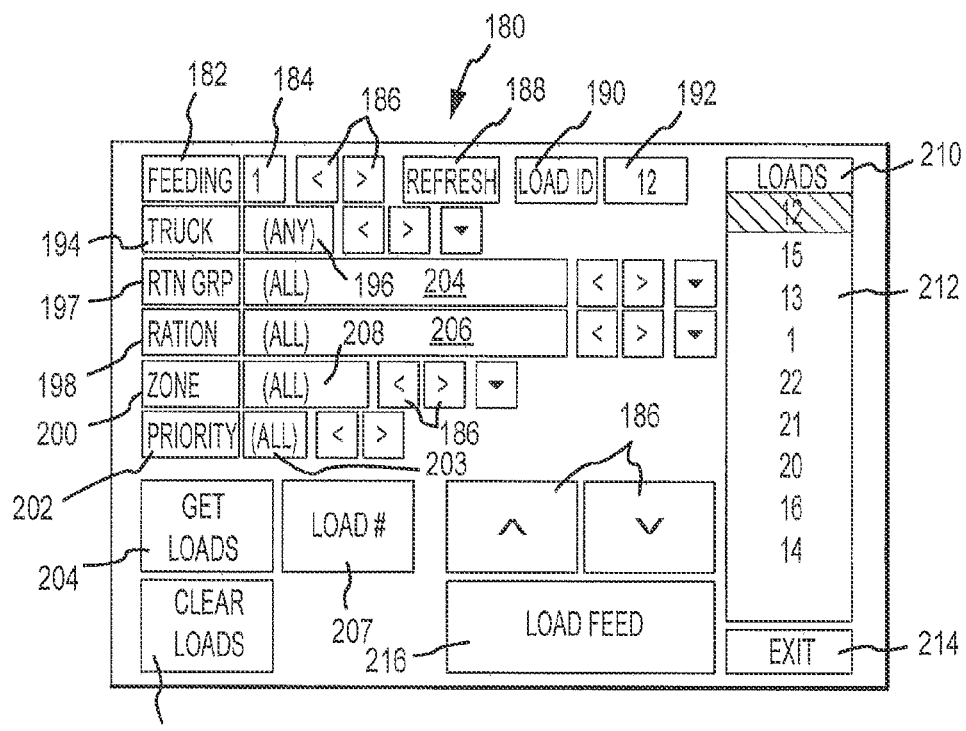
FIG. 9 is an example operator interface that enables the vehicle operator to execute a load sequence to include the selecting and loading of designated ingredients according to a recipe for a called-for feed ration.

Referring to FIG. 9, an operator interface screen 180 is shown which allows the operator to acquire a load that may be then delivered by the operator to the transport location/feed mixture. Referring first to the top row of elements shown in the screen, the operator may request a load based on a pre-designated feeding number 182, shown in the block 184, which may correspond to a pre-designated feeding for the day. The operator may select the desired feeding number by manipulation of the scroll buttons 186. A refresh button 188 is provided to refresh the screen with respect to any one of the selection parameters to include feeding 182 and the others discussed below. Ultimately, when the operator selects a load, a load ID 190 is shown in the block 192 that corresponds to the selected load. Typically, there are a number of different ingredients which make up a particular load. Multiple loads make up a ration and one or more rations make up a feeding. A ration group includes one or more rations.

The operator may also select a particular load based upon the truck/vehicle 194 the operator is handling. That is, loads can be assigned to a particular truck/vehicle, and therefore, the operator would simply select the truck/vehicle number/designation corresponding to his/her truck displayed in the block 196. Again, selection buttons 186 are provided to allow the operator to scroll through the truck options. Other ways in which the operator may acquire information for a particular load may be by a ration group 197 as displayed in block 204, by ration 198 as displayed in block 206, a zone 200 as displayed in block 208, or a priority 202 as displayed in the block 203. It should be understood in this screen shot that the words "any" and "all" as appearing in the data blocks simply indicate that the operator has the option of selecting the load according to any or all of the elements appearing in a corresponding database. The zone 200 refers to a pre-designated geographic location within the feedlot or other area where the vehicle operator is conducting work. For example, the operator could request loads for a pre-designated zone of the feedlot which requires feeding.

Figure 10:
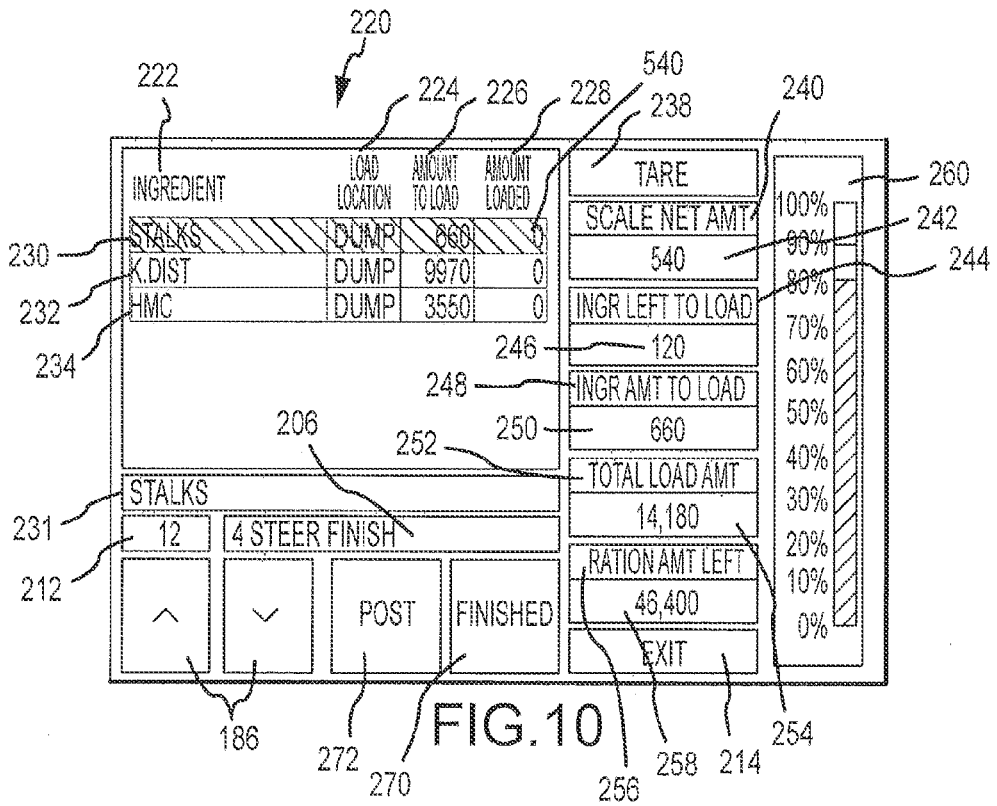
FIG. 10 is another operator interface showing other features of the system enabling the operator to execute a load sequence.

Once the operator has entered the information to request specific ingredient information for a load, the operator may activate the Get Loads button 204 which then displays information on the requested load, to include the specific commodities/ingredients that make up the selected load, the locations of the ingredients, and the amounts to be loaded as discussed in more detail with respect to FIG. 10. The load # button 207 is yet another way in which the operator can request information on a particular load by manually entering the load number on his/her operator interface. That is, if the operator already knows that a particular load must be delivered, the user may manually request information on the load by entering the load number or by selecting it from a listing of load numbers (not shown) on the screen. The Clear Loads button 208 enables the operator to clear information obtained regarding a load and to start over in requesting load information.

Assuming the desired information has been obtained in order to identify a load that is ready for transport by the vehicle, the load information 210 is displayed on the right hand side of the screen in the form of a listing of load numbers 212. The user may select information on a desired load number by use of the large navigation buttons 186 positioned above the Load Feed button 216. The first or highest priority load is shown at the top of the listing of loads. In the example of FIG. 9, the loads listed may correspond to a particular ration or ration group in which the operator is first required to load the load number 12, and then sequentially load the other designated load numbers as they appear on the listing 212. FIG. 9 also illustrates that the load numbers themselves are not sequential, that is, a particular ration or ration group could be defined by a sequential number of loads, (for example, 1-22), however, for purposes of delivery on that particular day and at that particular time, the vehicle operator has been instructed to pick up load numbers in a particular sequence which may be due to, for example, a decision made by a supervisor that a particular load comprising a particular set of ingredients needs to be first delivered to a location within the feed yard.

Once the operator has received and has reviewed the load information listing 212, the operator may now begin reviewing information on the specific ingredients to be retrieved from the ingredient storage locations. The operator executes this next step by pressing the Load Feed button 216, and the discussion of FIG. 10 addresses what new information is displayed. Finally, FIG. 9 illustrates exit button 214 which enables the operator to scroll to other operator interface screens.

Now referring to FIG. 10, an example operator interface screen 220 is shown that corresponds to the information for the load number 12, which was requested in the Get Loads screen 180. In this loading screen 220, the real time communication/interaction begins between the various scales (on truck loading, dump box loading, or other delivery/weighing systems) as well as communications/interactions between the GPS unit onboard the vehicle and the other GPS units located within the feed yard.

In FIG. 10, the screen 220 provides specific information as to the particular ingredients 222 that are to be delivered and loaded in/onto the transport loading area 152, beginning first with the highest priority or first load number. The first ingredient to be loaded for the load is highlighted on the screen, and is shown in FIG. 10 as cornstalks (STALKS) 230. The load location 224 refers to the particular storage location where the ingredient is to be withdrawn from, and the example in FIG. 10 simply refers to the load location as DUMP; however in practice, the load location would list a particular GPS coordinate storage location as describe above with reference to FIG. 6. The amount to load 226 refers to the amount of the ingredient that must be loaded to satisfy the recipe for the load, and in the example of FIG. 10 is displayed as 660 lbs. The amount loaded column 228 shows the amount of the ingredient that has been loaded thus far, and in the example is displayed as 540 lbs. The other ingredients within the load which are to be next loaded are shown as K. DIST 232, and high moisture corn (HMC) 234. Again, the load locations and amounts of these ingredients to be loaded are displayed. To confirm that the STALKS ingredient 230 highlighted in the screen is what the operator must load at that time, the same ingredient will also be displayed in the larger ingredient window 231 located below the listing of ingredients. This screen will also confirm the load number and the identification of the ration. Accordingly, the screen in FIG. 10 also displays the load number 12 in the window 212, and the particular name of the ration in window 206. In FIG. 10, the ration has been designated as "4 Steer Finish". Typically, a ration has both a numerical and alpha identifier. The large navigation buttons 186 below the ration window 206 can be used by the operator to scroll between the listing of ingredients.

Now referring to the right side of the screen for FIG. 10, various loaded and amounts left to be loaded are displayed, and correspond to what is happening in real time in terms of loading of ingredients to satisfy the load requirement for the ration. Specifically, the scale net amount (Scale Net AMT) 240 is displayed at block 242 and shows that 540 lbs of the STALKS ingredient 230 has been loaded in/onto the transport loading area 152. The ingredient amount left to be loaded (INGR LEFT TO LOAD) 244 is displayed in block 246 and shows that 120 lbs must still be loaded to satisfy the required 660 lbs. The total ingredient amount that must be loaded (INGR AMT TO LOAD) 248 displayed in block 250 corresponds to what is listed also in the Amount to Load column 226. The total amount to be loaded for the load (TOTAL LOAD AMT) 252 is shown in block 254 as 14,180 lbs. This amount comprises the sum of the weights for all of the ingredients listed for the particular load. FIG. 10 also displays the total amount of the ration that remains to be loaded (RATION AMT LEFT) 256, shown in block 258 as 46,400 lbs. This total amount left to be loaded for the ration is made up of the remaining loads, or selected loads from the listing that appears in FIG. 9. Therefore the operator can expect that to satisfy the called-for ration, the operator will have to load a number of other ingredients corresponding to perhaps four or five additional load numbers. FIG. 10 also shows a tare weight button (TARE) 238. If the operator presses this button, the block 242 can alternatively show the tare or empty weight of a designated object, such as the empty weight of the transport loading area 152. To confirm that the transport loading area is empty prior to receiving the first ingredient for the first load of a ration, the operator may have to physically inspect the loading area, and in any event will wish to obtain a tare weight of the transport loading area 152 that could hold either another vehicle which will then transport the ingredients, or a container or mixer that will receive the ingredients. Accordingly, the transport loading area 152 would be equipped with one or more scales enabling the operator to obtain the tare weight.

Also referring to FIG. 10, the POST button 272 is pressed by the operator once the highlighted ingredient has been fully loaded. So for the example of the STALKS ingredient 230, the operator would press the POST button 272 to indicate that the loading of the cornstalks is complete. Once the data processing systems compares the weight of the amount loaded on the scale at the transport loading area 152 and confirms that the 660 lbs has been loaded, the screen will then automatically highlight the next ingredient that is to be loaded, and the loaded amount for the cornstalks is recorded in a database of the data processing system. It is also contemplated in the present invention that the data processing system can automatically capture the satisfied loading of the 660 lbs at the transport loading area 152 so that the operator would not be required to press the POST button 272. FIG. 10 also shows a FINISHED button 270. The operator can press this button at the end of loading all ingredients for the designated load to review information regarding when, how much and where each of the ingredients were withdrawn from and when, how much and where each of the ingredients were delivered to and loaded. In the event the operator has previously received an error message, or if the operator simply wishes to review the recent efforts in satisfying a load requirement, this button can be used for generation of a display (not shown), that provides this detailed information.

In the event an overage or surplus was delivered to the transport loading area outside of an authorized tolerance range, an error message would appear on the screen (not shown) advising the operator that a designated amount of the cornstalks must be removed from the transport loading area. At this time, the system also conducts a cross-check of the amount of the ingredient delivered to the transport loading area versus the amount of the ingredient that was withdrawn from the storage location. If there is a discrepancy that falls outside of another pre-designated authorized tolerance range, then one or more additional error messages would be generated, as explained more fully below with reference to the FIGS. 12-15.

Figure 11:
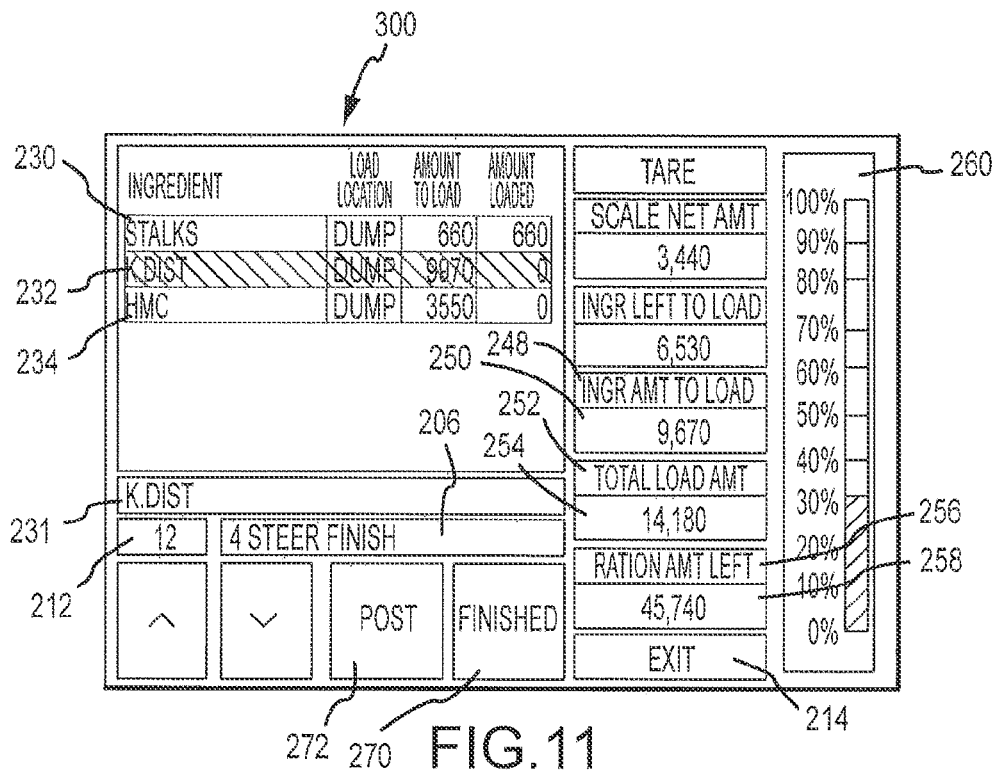
FIG. 11 is yet another operator interface screen providing information to the operator for execution of a load sequence.

Now referring to FIG. 11, another screen shot 300 is shown that displays the next step in the loading process, namely, the requirement to load the next ingredient shown as ingredient K. DIST 232. Like the loading of the STALKS in FIG. 10, the screen 300 of FIG. 11 illustrates the progression of loading for this second ingredient. As shown, there is 9,670 lbs of the K. DIST ingredient 232 that must be loaded, 3,440 lbs have been loaded thus far, and 6,530 lbs are left to be loaded for the ingredient. The screen 300 also shows that the total load amount for the load 12 still remains at 14,180 lbs, but the total ration amount left to be loaded is 46,400-660, or 45,740. Accordingly, the RATION AMT LEFT 256 shows the remaining amount left to be loaded of 45,740. Once the K. DIST ingredient 232 has been fully loaded, the operator may then post this amount by pressing the POST button 272.

FIGS. 10 and 11 also provide a convenient real time scale representation 260 which indicates to the operator the amount of ingredient that has been loaded. In the example of FIG. 10, approximately 80% of the STALKS ingredient 230 has been loaded, while in FIG. 11 approximately 30% of the K. DIST ingredient 232 has been loaded.

Figure 12:
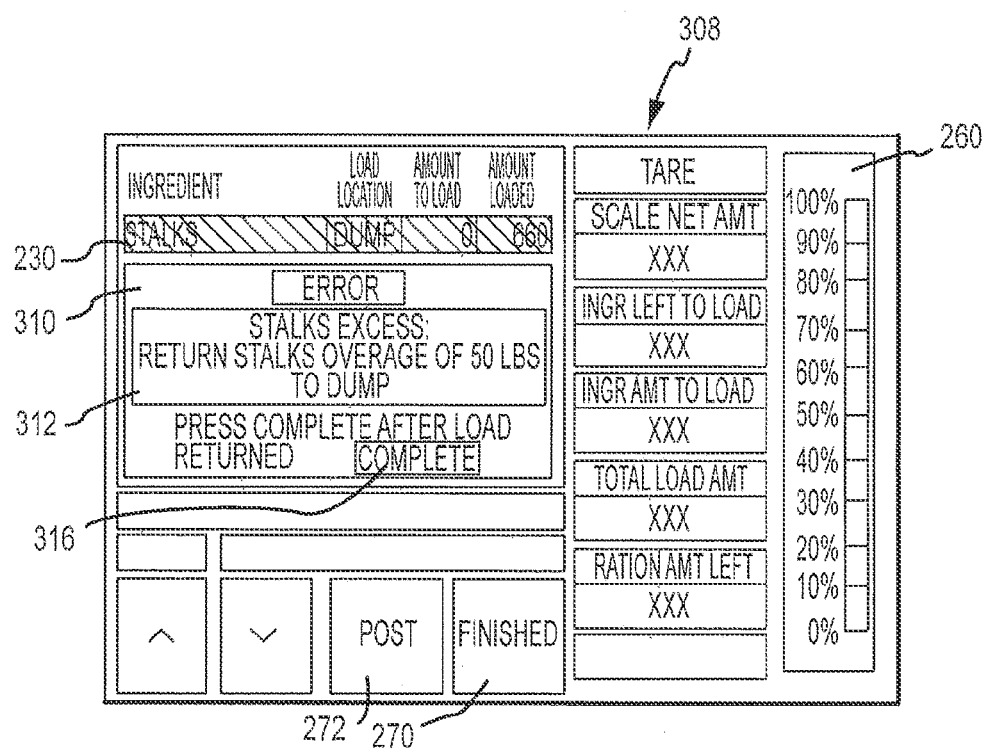
FIG. 12 is yet another operator interface screen illustrating an alarm/error message for consideration by the vehicle operator indicating a surplus/overage of ingredients that must be accounted for and returned to the corresponding storage locations.

Referring to FIG. 12, another operator interface screen 308 is illustrated in which the system has detected an error, shown in error message block 310. In the example screen 308, the error block 310 states the specific error message in message block 312, namely, that there is an excess in the amount of cornstalks which have been withdrawn from the cornstalks location in the feed yard and therefore, the operator is required to return the overage to the specified storage location. More specifically, in this example the error message indicates that there was an overage withdrawn from the cornstalks storage location of approximately 50 lbs and the operator presumably has approximately 50 lbs of cornstalks still loaded on the vehicle. At this point in time, the operator must return to the location where the cornstalks are stored, and when the cornstalks have been returned, the operator presses the complete button 316 to indicate that the scales at the cornstalks storage location should now be recalculated to account for the returned cornstalks. In order to further advise the operator of the error condition, the series of blocks that display the amounts of materials can flash or these blocks could display warning characters such as a group of letters, shown in this figure as three letters X.

Figure 13:
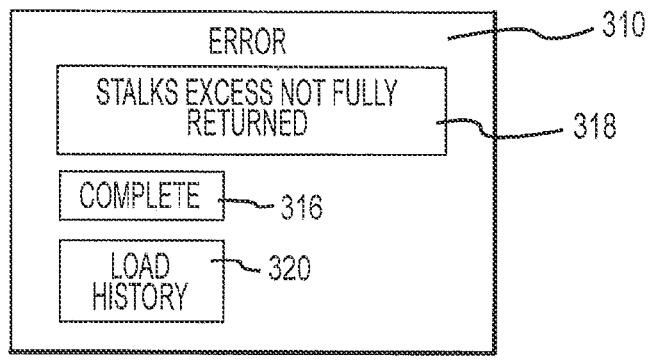
FIGS. 13-15 are other errors/alarm messages that enable the operator to rectify discrepancies in ingredient accountability.
Figure 14:
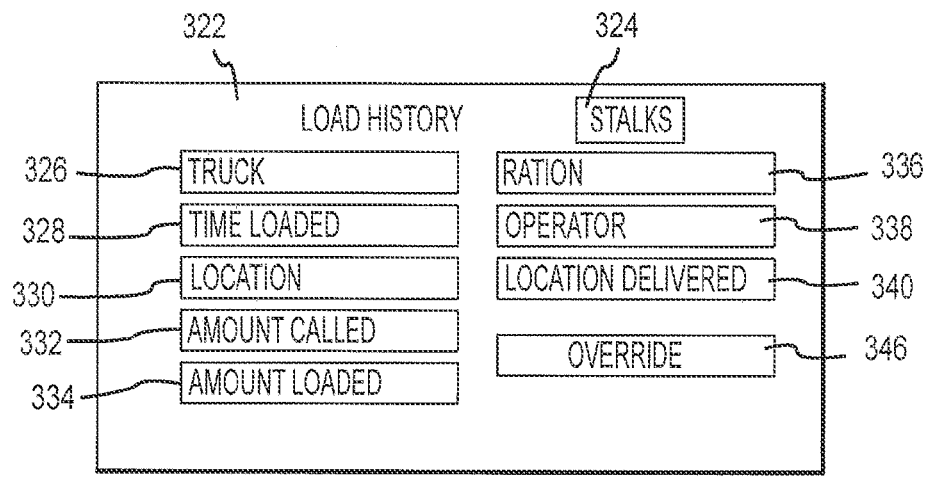

Referring now to FIG. 13, if some amount but not all of the cornstalks have been returned and the amount returned falls outside of an allowable range, yet another error message 310 can be displayed, shown as STALKS NOT FULLY RETURNED 318. At this point in time, the operator must again attempt to return the remaining amount of cornstalks. If the operator cannot determine where the remaining cornstalks are located, and otherwise cannot return the requested amount, the operator may click on the load history button 320 which will display the load history information 322 as shown in the FIG. 14. Specifically, the load history information 322 includes a listing of the specific ingredient at issue in block 324, the truck used at block 326, the time the ingredient was initially loaded at block 328, the specific location within the feed yard where the ingredient is located at block 330, the amount called for within the recipe at block 332, the actual amount loaded at block 334, the ration number and ration group at block 336, the operator who was associated with the vehicle/truck at the time the ingredient was loaded at block 338, and the actual location delivered at block 340. From this extensive information, the operator should be able to determine where the overage is located, and how to get that overage back to original ingredient location. If the operator still cannot account for the missing amounts of ingredients, the operator can activate the override button 346, which under some circumstances, may allow the operator to bypass the last error message, or may offer other solutions to the operator such as supervisor intervention in which the supervisor may override the error message and allow for a continued loading sequence.

Figure 15:
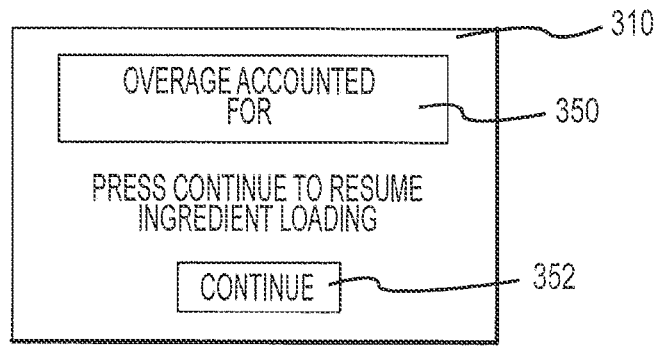

Referring to FIG. 15, the last error message/status message 310 provided is an example when the overage/surplus has been accounted for by return of the materials to the designated storage location as shown by the message OVERAGE ACCOUNTED FOR in the block 350. At this point, the message 310 then instructs the operator to resume ingredient loading by pressing the continue button 352. Accordingly, the next screen which appears is another load screen for loading of the next ingredient within the designated load.

There are a number of advantages to the invention described above. A comprehensive data processing system and method are provided in which not only are ingredients accounted for based on what is actually delivered to a transport area for subsequent feeding to animals, but also for excess materials that may have been withdrawn from one or more storage locations, and which also must be accounted for to ensure subsequent rations are not cross contaminated with improper ingredients. The system and method also provide a solution for much improved commodity inventory control for all ingredients. By use of the GPS tracking capabilities in conjunction with scales located at the transport area and at the ingredient storage locations, a vehicle operator is provided detailed information as to not only fulfilling ingredient requirements for each load of each ration, but also information for inventory control and to prevent contamination of later loads and rations. Therefore, each time an operator deals with a particular ingredient, the entire amount of the ingredient is accounted for either as being delivered to a designated load, or returned to its storage location. Over time, such detailed control of ingredients not only provides quality control in terms of the exact makeup of designated feed rations, but also provides a long term cost savings by preventing waste of ingredients.

Although the present invention has been described with respect to one or more preferred embodiments to include the data processing system and method, it shall be understood that various changes and modifications to the invention may be made commensurate with the scope of the following claims.

What is claimed is:

1. A method of accounting for an ingredient called for in an animal feed ration, the method comprising:
   receiving an indication that the ingredient for the animal feed ration has been withdrawn from a designated storage location, wherein the indication includes the weight of the ingredient withdrawn from the designated storage location;
   receiving an indication that the ingredient has been delivered to a designated delivery location, wherein the indication includes the weight of the ingredient delivered to the designated delivery location;
   in response to receiving the indication that the particular ingredient has been delivered to the designated delivery location:

determining, via a processor, whether an overage or surplus was delivered to the designated delivery location that is outside of an authorized tolerance range; and determining, via a processor, whether there is a discrepancy between the amount of the ingredient withdrawn from the designated storage location and the amount of the ingredient delivered to the designated delivery location that is outside another authorized tolerance range;

in response to determining that an overage or surplus was delivered to the designated delivery location that is outside of the authorized tolerance range, displaying, via an operator interface screen, a message or warning advising an operator that a certain amount of the ingredient must be removed from the designated delivery location; and in response to determining that there is a discrepancy between the amount of the ingredient withdrawn from the designated storage location and the amount of the ingredient delivered to the designated delivery location that is outside of the another authorized tolerance range, displaying, via an operator interface screen, a message or warning including the amount of the discrepancy and instructions to rectify the discrepancy.

2. The method of claim 1, further comprising receiving and storing the identity, weight, and time of the ingredient at the designated storage location each time an amount of the ingredient is added to or removed from the designated storage location.

3. The method of claim 1, further comprising receiving and storing the identity, weight, and time of the ingredient at the designated delivery location each time an amount of the ingredient is added to or removed from the designated delivery location.

4. The method of claim 1, further comprising:
tracking the movement of at least one vehicle that is used to withdraw and deliver the ingredient utilized in the animal feed ration; and
storing the vehicle movement data, including associated time data, in a database.

5. The method of claim 1, wherein the certain amount of the ingredient that must be removed from the designated delivery location comprises the amount of the overage or surplus.

6. The method of claim 1, wherein the instructions identify the location where the discrepant amount of the ingredient should be delivered.

7. The method of claim 1, further comprising in response to determining there is a discrepancy between the amount of the ingredient withdrawn from the designated storage location and the amount of the ingredient delivered to the designated delivery location that is outside of the another authorized tolerance range, preventing, via a processor and the operator interface screen, an operator from obtaining information on another ingredient to be delivered to the designated delivery location until the discrepancy is rectified.

8. A system for accounting for a plurality of ingredients called for in an animal feed ration, the system comprising:
a memory;
a processor in connection with the memory, the processor operable to execute software modules, the software modules comprising:
an ingredient module configured to determine the identity and amounts of ingredients utilized in the animal feed ration;
a load sequence module configured to determine a load sequence of the ingredients based on the identity and amounts of ingredients, wherein completion of the load sequence fulfills the animal feed ration;
a storage location module configured to receive an indication that a particular ingredient has been withdrawn from a storage location, wherein the indication includes the weight of the particular ingredient withdrawn from the storage location;
a delivery location module configured to receive an indication that the particular ingredient has been delivered to a delivery location, wherein the indication includes the weight of the particular ingredient delivered to the delivery location;
a discrepancy engine configured to determine whether there is a discrepancy between the amount of the particular ingredient withdrawn from the storage location and the amount of the particular ingredient delivered to the delivery location; and
a message module configured to generate a message or warning detailing the discrepancy between the amount of the particular ingredient withdrawn from the storage location and the amount of the particular ingredient delivered to the delivery location.

9. The system of claim 8, wherein the storage location module is configured to receive and store the identity, weight, and time of the particular ingredient at the storage location each time an amount of the particular ingredient is added to or removed from the storage location.

10. The system of claim 8, wherein the delivery location module is configured to receive and store the identity, weight, and time of the particular ingredient at the delivery location each time an amount of the particular ingredient is added to or removed from the delivery location.

11. The system of claim 8, wherein the software modules further comprise a vehicle tracking module configured to track the movement of at least one vehicle that is used to withdraw and deliver the ingredients called for in the animal feed ration and to store the vehicle movement data, including associated time data, in a database.

12. The system of claim 8, wherein the message or warning includes the amount of the discrepancy and instructions to rectify the discrepancy.

13. The system of claim 12, wherein the instructions identify the location where the discrepant amount of the particular ingredient should be delivered.

14. The system of claim 8, wherein the message module is further configured to prevent an operator from obtaining information on a next ingredient in the load sequence until an outstanding discrepancy is rectified.

15. The system of claim 8, wherein the message module is further configured to actuate an audible alarm in response to a discrepancy between the amount of the particular ingredient withdrawn from the storage location and the amount of the particular ingredient delivered to the delivery location.

16. The system of claim 8, further comprising an operator interface screen in connection with the software modules.

17. The system of claim 8, further comprising a weight scale associated with the storage location and the delivery location.

18. The system of claim 8, further comprising an overage or surplus engine configured to determine whether an overage or surplus of the particular ingredient was delivered to the delivery location, and wherein the message module is further configured to generate another message or warning detailing the amount of the overage or surplus.

* * * * *